US008689178B2

(12) United States Patent  
Ambrose et al.

(10) Patent No.: US 8,689,178 B2  
(45) Date of Patent: Apr. 1, 2014

(54) DEVELOPMENT TOOL, METHOD, AND SYSTEM FOR CLIENT SERVER APPLICATIONS

(75) Inventors: Jesse Ambrose, San Jose, CA (US); Thomas M. Rothwein, San Jose, CA (US); Klaus W. Strobel, Key Largo, FL (US)

(73) Assignee: Oracle International Corporation, Redwood Shores, CA (US)

( * ) Notice: Subject to any disclaimer, the term of this patent is extended or adjusted under 35 U.S.C. 154(b) by 983 days.

(21) Appl. No.: 11/786,088

(22) Filed: Apr. 10, 2007

(65) Prior Publication Data

US 2007/0277153 A1     Nov. 29, 2007

Related U.S. Application Data

(63) Continuation of application No. 10/371,920, filed on Feb. 21, 2003, now Pat. No. 7,203,938, which is a continuation of application No. 09/867,263, filed on May 30, 2001, now Pat. No. 6,553,563, which is a continuation of application No. PCT/US99/28427, filed on Nov. 30, 1999.

(60) Provisional application No. 60/110,416, filed on Nov. 30, 1998.

(51) Int. Cl.  
*G06F 9/44* (2006.01)

(52) U.S. Cl.  
USPC ........... 717/108; 717/116; 717/120; 717/121; 717/122

(58) Field of Classification Search  
USPC .......................... 717/108, 116, 120, 121, 122  
See application file for complete search history.

(56) References Cited

U.S. PATENT DOCUMENTS

| | | | |
|---|---|---|---|
| 5,249,300 A | 9/1993 | Bachman et al. |
| 5,339,438 A | 8/1994 | Conner et al. |
| 5,386,568 A | 1/1995 | Wold et al. |
| 5,493,680 A | 2/1996 | Danforth |
| 5,651,108 A | 7/1997 | Cain et al. |

(Continued)

FOREIGN PATENT DOCUMENTS

| | | |
|---|---|---|
| EP | 0 811 193 A | 10/1997 |
| WO | WO 00/33187 | 6/2000 |
| WO | WO 2004/003684 | 1/2004 |
| WO | WO 2004/061815 | 7/2004 |

OTHER PUBLICATIONS

Garlan et. al., "Architectural Mismatch or Why it's Hard to Build System Out of Existing Parts," ACM ICSE, pp. 179-185, 1995.

(Continued)

*Primary Examiner* — Qamrun Nahar  
(74) *Attorney, Agent, or Firm* — Campbell Stephenson LLP

(57) ABSTRACT

A software development method and system having a suite of graphical customization tools that enables developers to rapidly configure all aspects of the underlying application software, including the look-and-feel, behavior, and workflow. This is accomplished without modifying application source code, base objects, or SQL. The sophisticated repository management capabilities of the method and system of our invention allows teams of developers to work efficiently on configuring applications. The application upgrader provides an automated process to upgrade the customizations to future product releases thus protecting the investment in customization. The ease, comprehensiveness, scalability, and upgradeability of the customization process help reduce the total lifecycle cost of customizing enterprise applications.

13 Claims, 6 Drawing Sheets

(56) References Cited

U.S. PATENT DOCUMENTS

| | | | |
|---|---|---|---|
| 5,715,450 A | 2/1998 | Ambrose et al. | |
| 5,732,263 A | 3/1998 | Havens et al. | |
| 5,751,909 A | 5/1998 | Grower | |
| 5,768,510 A | 6/1998 | Gish | |
| 5,787,275 A | 7/1998 | Li | |
| 5,802,514 A | 9/1998 | Huber | |
| 5,819,092 A | 10/1998 | Ferguson et al. | |
| 5,832,274 A | 11/1998 | Cutler et al. | |
| 5,845,128 A | 12/1998 | Noble et al. | |
| 5,911,075 A | 6/1999 | Glaser et al. | |
| 5,970,252 A * | 10/1999 | Buxton et al. | 717/166 |
| 5,978,579 A | 11/1999 | Buxton et al. | |
| 6,002,867 A | 12/1999 | Jazdzewski | |
| 6,043,815 A | 3/2000 | Simonoff et al. | |
| 6,104,874 A | 8/2000 | Branson et al. | |
| 6,175,948 B1 * | 1/2001 | Miller et al. | 717/143 |
| 6,182,277 B1 | 1/2001 | DeGroot et al. | |
| 6,233,617 B1 | 5/2001 | Rothwein et al. | |
| 6,249,905 B1 * | 6/2001 | Yoshida et al. | 717/100 |
| 6,263,498 B1 | 7/2001 | Alcorn et al. | |
| 6,268,853 B1 | 7/2001 | Hoskins et al. | |
| 6,272,537 B1 | 8/2001 | Kekic et al. | |
| 6,286,017 B1 | 9/2001 | Egilsson | |
| 6,292,925 B1 | 9/2001 | Dellinger et al. | |
| 6,367,077 B1 | 4/2002 | Brodersen et al. | |
| 6,370,681 B1 | 4/2002 | Dellarocas et al. | |
| 6,378,003 B1 | 4/2002 | Danforth | |
| 6,415,027 B1 | 7/2002 | Malik | |
| 6,418,450 B2 | 7/2002 | Daudenarde | |
| 6,434,740 B1 | 8/2002 | Monday et al. | |
| 6,457,164 B1 | 9/2002 | Hwang et al. | |
| 6,526,423 B2 | 2/2003 | Zawadzki et al. | |
| 6,553,563 B2 | 4/2003 | Ambrose et al. | |
| 6,567,807 B1 | 5/2003 | Robles et al. | |
| 6,574,630 B1 | 6/2003 | Augustine et al. | |
| 6,574,635 B2 | 6/2003 | Stauber et al. | |
| 6,647,394 B1 | 11/2003 | Herzberg et al. | |
| 6,684,388 B1 | 1/2004 | Gupta et al. | |
| 6,693,647 B1 | 2/2004 | Bernard et al. | |
| 6,697,825 B1 | 2/2004 | Underwood et al. | |
| 6,754,885 B1 | 6/2004 | Dardinski et al. | |
| 7,010,523 B2 | 3/2006 | Greenfield | |
| 7,051,319 B1 | 5/2006 | Thorson | |
| 7,089,530 B1 | 8/2006 | Dardinski et al. | |
| 7,117,449 B1 | 10/2006 | Levin et al. | |
| 7,203,938 B2 | 4/2007 | Ambrose et al. | |
| 7,316,000 B2 | 1/2008 | Poole et al. | |
| 2005/0216421 A1 | 9/2005 | Barry et al. | |
| 2007/0226728 A1 | 9/2007 | Thorson et al. | |

OTHER PUBLICATIONS

Benedicenti et al., "Reuse Libraries for Real Time Multimedia Over the Network," ACM SIGAPP, vol. 8, No. 1, Sep. 2000.

Henninger et al., "A Framework for Developing Experience Based Usability Guidelines," ACM DIS, pp. 43-53, 1995.

Carnell, M., "Applet Designer," DBMS and Internet Systems, Jun. 1997.

TV Objects Corporation, "Applet Designer Enterprise Edition," Jun. 1997.

Taulli, T., "Visual Basic Meets Java," Internet Java and ActiveX Advisor Magazine, Aug. 1997.

Sugumaran et al., "Identifying Software Components from Process Requirements Using Domain Model and Object Libraries," ACM, pp. 65-81, Jan. 1999.

Bernstein, "Repositories and Object Oriented Databases," ACM, pp. 88-96, Mar. 1998.

Henninger, "Supporting The Construction and Evolution of Component Repositories," ACM, pp. 279-288, 1996.

Chen et al., "Exploring Performance Issues for a Clinical Database Organized Using an Entity-Attribute-Value Representation," Journal of American Medicine Information Association, vol. 7, No. 5, pp. 475-487, Mar. 2000.

Henninger et al, "An Organizational Learning Approach to Domain Analysis," ACM ICSE, pp. 95-104, 1995.

* cited by examiner

FIG. 1

| | | | | |
|---|---|---|---|---|
| Account Attachment | | | ✓ | File |
| Account External Product | | | ✓ | File |
| Account Plan Admin | | | ✓ | Repository |
| Account Product | | | ✓ | Merge |
| Account Synonym | | | ✓ | File |
| Baseline | | | ✓ | Repository |
| Store Conditions | | | ✓ | File |
| Organization Unit Type | | | | File |

| | | | | |
|---|---|---|---|---|
| No Insert | FALSE | | FALSE | File |
| No Merge | FALSE | | TRUE | File |
| No Update | FALSE | | FALSE | File |
| Owner Delete | TRUE | | TRUE | Repository |
| Scripted | FALSE | | TRUE | Repository |
| Search Specification | | | Revenue > 1000000 | File |
| Sort Specification | Name, Location | | Name | File |
| Status Field | Row Status | | Row Status | File |
| Synonym Field | Joined Synonym | | Joined Synonym | File |
| Table | S_ORG_EXT | | S_ORG_EXT | File |

Import Wizard

Account

- ☐ Siebel Objects
  - ☐ Applet
    - ⊞ ☐ Account Baseline Applet
    - ⊞ ☐ Accrued Fund Applet
    - ⊞ ☐ Promotion Account Note Applet
    - ⊞ ☐ Promotion Chart Applet
    - ⊞ ☐ Store Conditions Applet
  - ☐ Business Component
    - ☐ Business Component Script
    - ☐ Business Component User Prop
    - ⊞ ☐ Field
    - ⊞ ☐ Join
    - ⊞ ☐ Multi Value Field
    - ⊞ ☐ Multi Value Link
    - ⊞ ☐ Single Value Field
    - ⊞ ☐ Account Attachment
    - ⊞ ☐ Account External Product
    - ⊞ ☐ Account Product
    - ⊞ ☐ Account Synonym
    - ⊞ ☐ Baseline
    - ⊞ ☐ Store Conditions

DEVELOPMENT TOOL, METHOD, AND SYSTEM FOR CLIENT SERVER APPLICATIONS

CROSS-REFERENCE TO RELATED APPLICATIONS

This application is a continuation of U.S. patent application Ser. No. 10/371,920, filed on Feb. 21, 2003 which is now U.S. Pat. No. 7,203,938, entitled "Development Tool, Method, and System for Client Server Applications," issued on Apr. 10, 2007, and naming Jesse Ambrose; Thomas M. Rothwein; Klaus W. Strobel as inventors, which is a continuation of U.S. patent application Ser. No. 09/867,263, filed on May 30, 2001, which is now U.S. Pat. No. 6,553,563, entitled "Development Tool, Method, and System for Client Server Applications," issued on Apr. 22, 2003, and naming Jesse Ambrose; Thomas M. Rothwein; Klaus W. Strobel as inventors, which is a continuation of PCT Application No. PCT/US99/28427, entitled "Development Tool, Method, and System for Client Server Applications," filed on Nov. 30, 1999, and naming Jesse Ambrose; Thomas M. Rothwein; Klaus W. Strobel as inventors, which claims the benefit of U.S. Provisional Application No. 60/110,416, entitled "Development Tool, Method, and System for Client Server Applications," filed on Nov. 30, 1998, and naming Jesse Ambrose; Thomas M. Rothwein; Klaus W. Strobel as inventors. These applications are incorporated by reference herein, in their entirety and for all purposes.

FIELD OF THE INVENTION

The method, and system of our invention relate to client server systems, and especially to development tools, methods and systems that build upon functions, routines, subroutines, subroutine calls, or object oriented programming.

BACKGROUND OF THE INVENTION

Programming paradigms built upon such concepts as functions and function calls, subroutines and subroutines and subroutine calls, global variables and local variables, and object orientation are characterized by such features as "reusable code" and "inheritance."

In older languages, such as FORTRAN and BASIC, reusability and inheritance were obtained through crafting of functions, routines, and subroutines that were called through global variables in a main program. Subsequently, this has evolved into object oriented programming in such languages as C++ and Java and is built upon a programming paradigm foundation of objects, functions, and class data types. An "object" is a variable that has "functions" associated with it. These functions are called "member functions." A "class" is a data type whose variable are "objects." The object's class, that is, the type of the object, determines which member functions the object has.

In a modern, object oriented programming language, such as C++ or Java, the mechanism to create objects and member functions is a "class." Classes can support "information hiding" which is a critical part of modern program design. In "information hiding", one programming team may design, develop, and implement a class, function, routine, or subroutine while another programming team may use the new class, function, routine, or subroutine. It is not necessary for the programmers who use the class, function, routine, or subroutine to know how it is implemented.

To be noted is that "object oriented programming" uses the terms "public" and "private" while the older techniques use the terms "global" and "local" for the domain of variables.

One aspect of both paradigms is "code reusability," whether implicitly by the subroutine or function calls of FORTRAN and the like or explicitly by declaring variables in C++ or JAVA.

There is an especially strong need for a development environment, including development tools, and either functions, routines, and subroutines with global and local variables, or base classes, to allow end users to develop business applications customized to their needs and derived from the supplied functions, routines, and subroutines with global and local variables, or base classes.

SUMMARY OF THE INVENTION

The method and system of our invention is an application development environment. It is designed to meet the customization needs of demanding sales, marketing, and customer service information system deployments.

One embodiment of our invention is a system for customizing an application program. The system includes a plurality of reusable modules (characterized as "base" modules in object oriented programming literature and as functions, routines and subroutines in other programming paradigms) for incorporation into end-user derived modules (characterized as "derived" in object oriented programming literature). At least one of the reusable modules has a set of variables accessible by an end-user ("public" in object oriented programming and "global" in conventional programming) and a set of variables not accessible by the end-user ("private" in object oriented programming and "local" in conventional programming). When a derived module incorporates a reusable module, the derived module inherits attributes of the reusable module.

A further aspect of our invention is the provision of a graphical editor for modifying and managing software modules, and an object visualization editor for graphically representing relationships between modules and variables within modules. A further aspect of our invention is the provision of one or more applet designer modules for doing one or more of modifying and extending lists, forms, dialogs, and chart user interfaces. The system can also include one or more view designer modules for visually modifying existing views, as well as wizard modules for creating end user created modules. In one embodiment of our invention at least one of the wizard modules provides an enumeration of required end-user entries for an end user module, this being in response to an end-user entry of the type of end-user created module to be created.

A directory or module repository manager may be provided to allow only one end-user to modify a module at one time.

Depending on the underlying source code, the system of the invention may include a compiler or translator for incremental compilation or translation of end user created modules.

In a preferred embodiment the system of our invention includes one or more interfaces for accessing data and rules from external applications.

In still another embodiment, especially useful for spreadsheet or database applications, the system includes database extension modules for extending a database and to capture data from new fields in one or more of application screens, and external sources. In a particularly preferred embodiment, the database extension modules may contain modules for triggering updates to client applications that reflect and incorporate new database extensions, and for reflecting new columns in existing end user created modules.

A further aspect of the system of our invention is the provision of modules for notification of conflicts between new end user created modules and existing modules. These modules may be incorporated in the translator or compiler, or in an index to the repository.

A further aspect of our invention is a method having for customizing an application program. This method works with the system of the invention, summarized above, and includes the steps of modifying and managing the end user created modules through a graphical editor; and graphically representing relationships between modules and variables within modules.

A further aspect of the method of our invention is doing one or more of modifying and extending lists, forms, dialogs, and chart user interfaces. Another aspect of our invention is visually modifying existing views.

Another aspect of the method of our invention is creating end user created modules using wizard modules. This may include the additional step of providing an enumeration of required end-user entries for an end user created module in response to an end-user entry of the type of end-user derived module to be created.

Yet another aspect of our invention is storing derived (that is, end user created) modules in a derived module repository manager. This is to allow only one end-user to modify a software module at one time.

A still further aspect of our invention is incrementally compiling a derived module.

Another aspect of our invention is accessing data and rules from external software applications through interfaces.

Another aspect of our invention is extending or scaling a database, that is, modifying its metadata and/or schema, to include new fields and capturing data from new fields in one or more of application screens, and external sources. A further aspect of this is triggering updates to client applications that reflect and incorporate new database extension, as well as reflecting new columns in existing end user created modules.

A further aspect of our invention is providing notification of conflicts between end user created modules and existing modules.

The software development method and system of our invention utilizes a suite of tools that serve as the bases for "reusability", whether implicitly or explicitly. This enables developers to rapidly configure all aspects of the underlying application software, including the look-and-feel, behavior, and workflow, without modifying application source code, SQL, or base classes. The sophisticated repository management capabilities of the method and system of our invention allows teams of developers work efficiently on configuring applications.

The suite of conventional and object oriented development tools includes a business object designer; a Microsoft Visual Basic-like scripting language, a set of business object interfaces, a Database Extension Designer, and an Application Upgrader.

The application upgrader provides an automated process to upgrade the customizations to future product releases thus protecting the investment in customization. The ease, comprehensiveness, scalability, and upgradeability of the customization process help reduce the total lifecycle cost of customizing enterprise applications.

To be noted is the difference between declarative programming and procedural programming. Declarative programming allows developers to control the behavior of a class by merely setting attribute values, that is, set the property color=black, instead of writing a line of code to set the color the color to black. This may be accomplished under either paradigm.

Also to be noted is that the meta-data repository that contains configuration and customization information can serve to separate this configuration and customization data from the application source code. By this expedient, developers and end-users can configure these objects in an intuitive and easy manner that is less prone to error.

THE FIGURES

The method and system of our invention may be understood by reference to the Figures appended hereto.

FIG. 1 illustrates a screen shot of a Business Component definition.

DETAILED DESCRIPTION OF THE INVENTION

Using the method and system of our invention, teams of developers can work together cooperatively, to rapidly customize all aspects of software applications without modifying application source code, SQL, or vendor supplied base classes (referred to herein as "business objects"). This approach to customization results in dramatically lower development and maintenance costs, and provides seamless upward compatibility with future product releases.

The components of the development tool include:
1. A business object designer
2. A language, such as Microsoft Visual Basic, Microsoft Visual C++, Microsoft Visual J++ or the like.
3. Business object interfaces
4. A Database Extension Designer
5. An Application Upgrader

Business Object Designer

The business object designer gives developers the ability to quickly and easily customize software applications. It includes a business object explorer. This is a graphical editing tool for modifying and managing object definitions. It includes a hierarchical object explorer that allows developers to browse the various object types, an object list editor viewing and editing object definitions, and a properties window for editing object property values. The business object explorer also includes a Windows-style "Find" capability that allows developers to quickly locate objects in the repository.

Object Visualization Views

Figure 2:
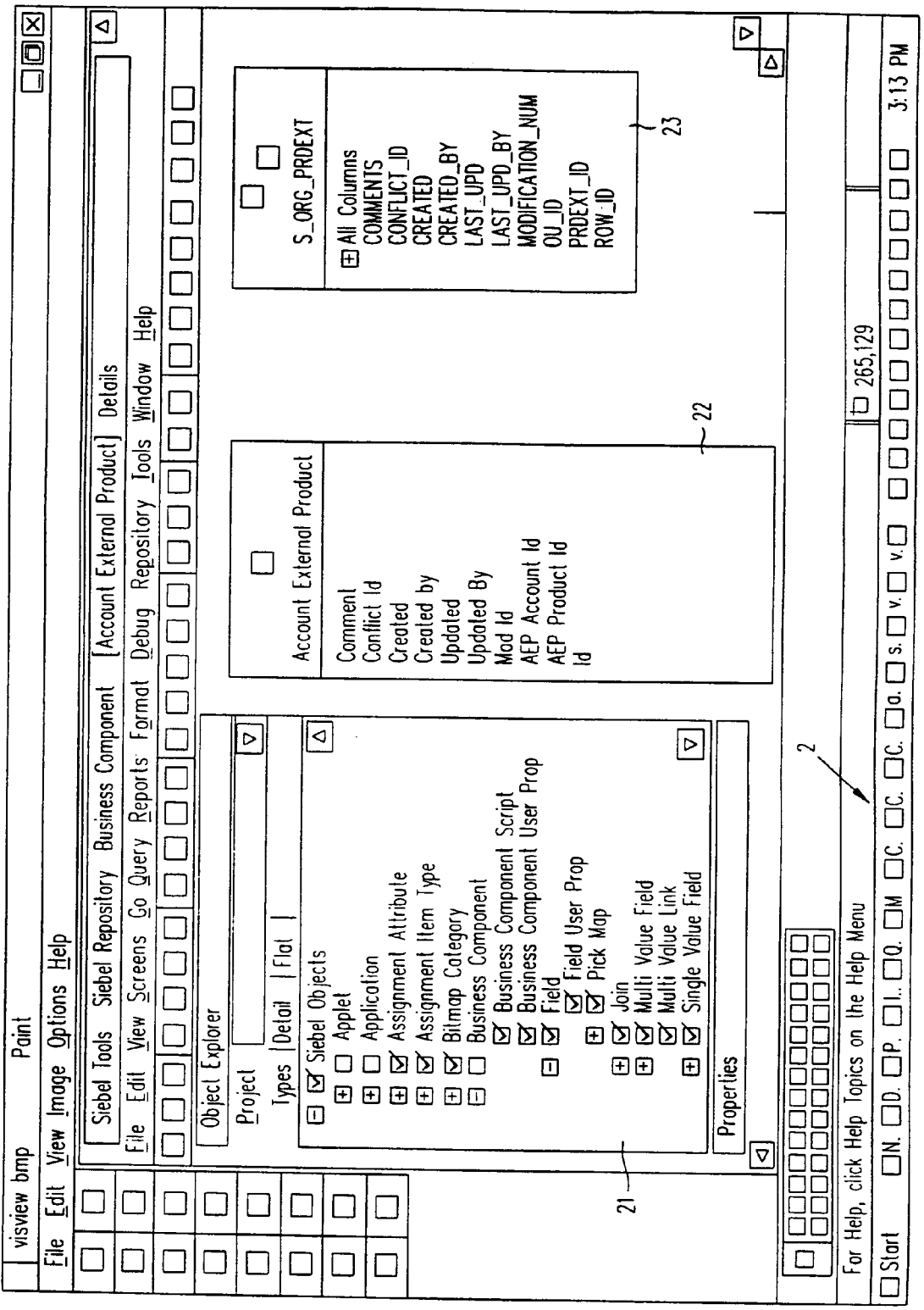
FIG. 2 illustrates a screen shot of details of a Business Component definition.

The Object Visualization Views are a set of graphical representations of the relationships between the various object definitions in the business object repository that help simplify the configuration process. A typical application configuration contains thousands of objects. Developers can use these views to understand and navigate through the object hierarchies. Then, using the editing tools, they can modify the properties of these objects. These views help assess the impact of these modifications, and track down configuration errors. The visualization views can be printed and used as a valuable reference during configuration. FIG. 1 illustrates a screen shot of a Business Component definition, 1, with an objects field, 11, a field indicating the source and type of components, 12, and a field indicating the actions to be taken with respect to a component, 13, while FIG. 2 illustrates a screen shot of the details of a Business Component definition with the account object explorer, 21, the account external products, 22, and the object attributes, 23. It depicts the various Fields in the Business Component, their types, and points to their respective sources—either Columns in underlying database tables, or Fields in other Business Components. A developer can further introspect the properties of an object in this view, by using the Properties window. The other Visualization Views work similarly. The Hierarchy View describes the object hierarchy as it relates to the selected object i.e. the Objects used by the selected Object and the Objects that use it. For example, the Hierarchy View for a View Object will show the Applets contained in that View, the Business Components on which each of these Applets are based, the Screens and Applications in which this View appears.

Applet Designer

Figure 3:
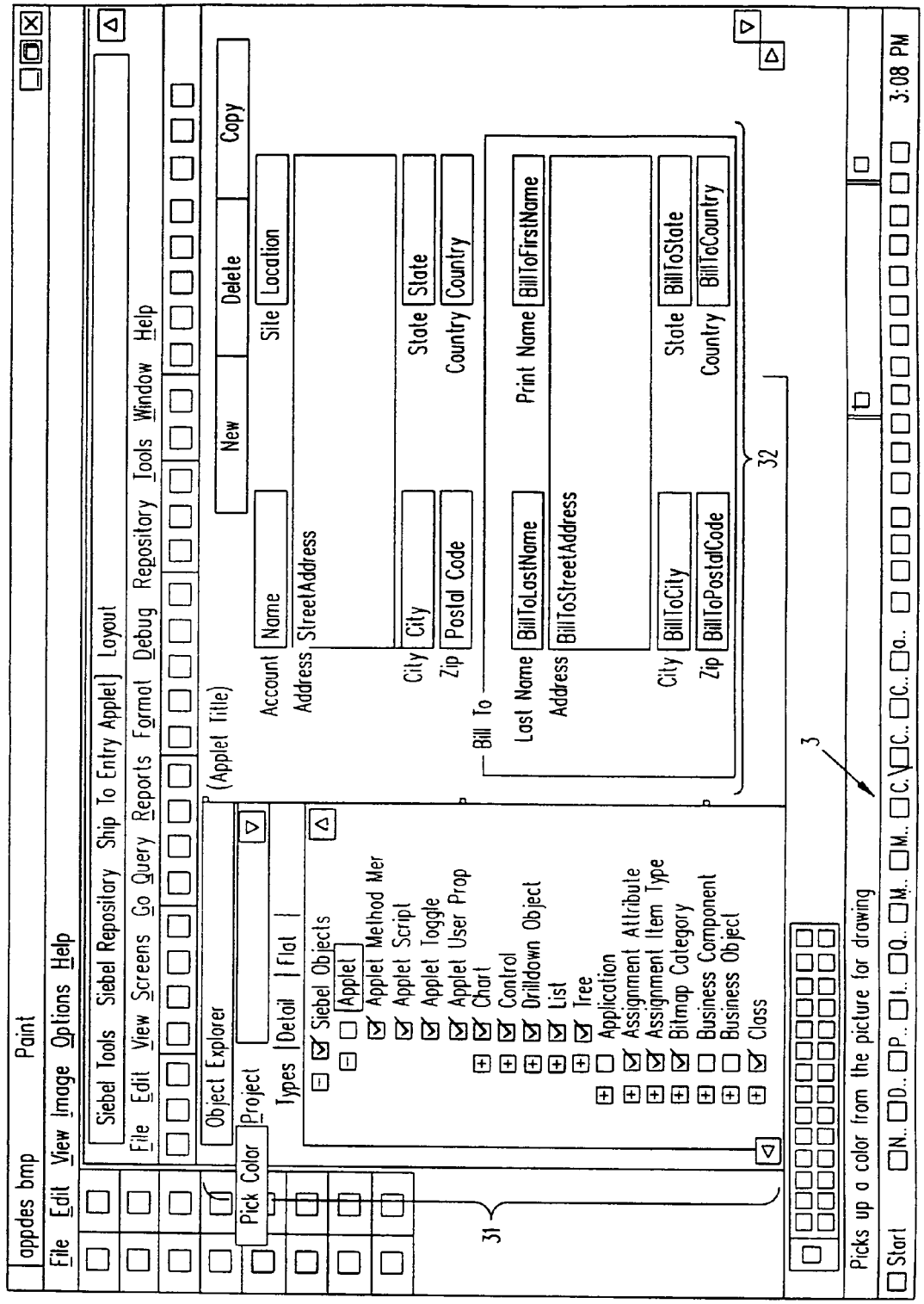
FIG. 3 illustrates a screen shot of features of the Applet Designer.

The Applet Designer module is an intuitive drag-and-drop visual programming interface for modifying and extending list, form, dialog, and chart user interface objects (Applets). These objects can be populated with standard Windows controls, including buttons, combo boxes, check boxes, labels, and text fields, as well as ActiveX controls. The Applet Designer of the method and system of our invention leverages the familiarity of developers with popular graphical application development tools such as Microsoft Visual Basic. Features of the Applet Designer are illustrated in FIG. 3. These include the object explorer, 31, and the applet being designed or modified, 32. An account information form is being designed in block 32.

The developer can add, delete, and modify the properties of the controls. The controls can be configured using the Properties Window. For example, a control can be associated with a Field in the underlying Business Component. This is accomplished by setting the Field attribute of the Control to one of the Fields in the Business Component. The choice of Fields is limited to those that belong to the Business Component that the Applet is based on. The behavior of controls can be scripted using the Visual Basic or other script editor. The Applet Designer also helps ensure visually accurate and correctly translated configurations by providing a design-time preview of the Applet on various screen resolutions, and under different language settings. In this mode, the Applet designer simulates the Applet being viewed under the specified settings and allows the developer to quickly detect any presentation errors such as truncation or overlapping controls. Features of the Applet Designer are illustrated in FIG. 3.

View Designer

Figure 4:
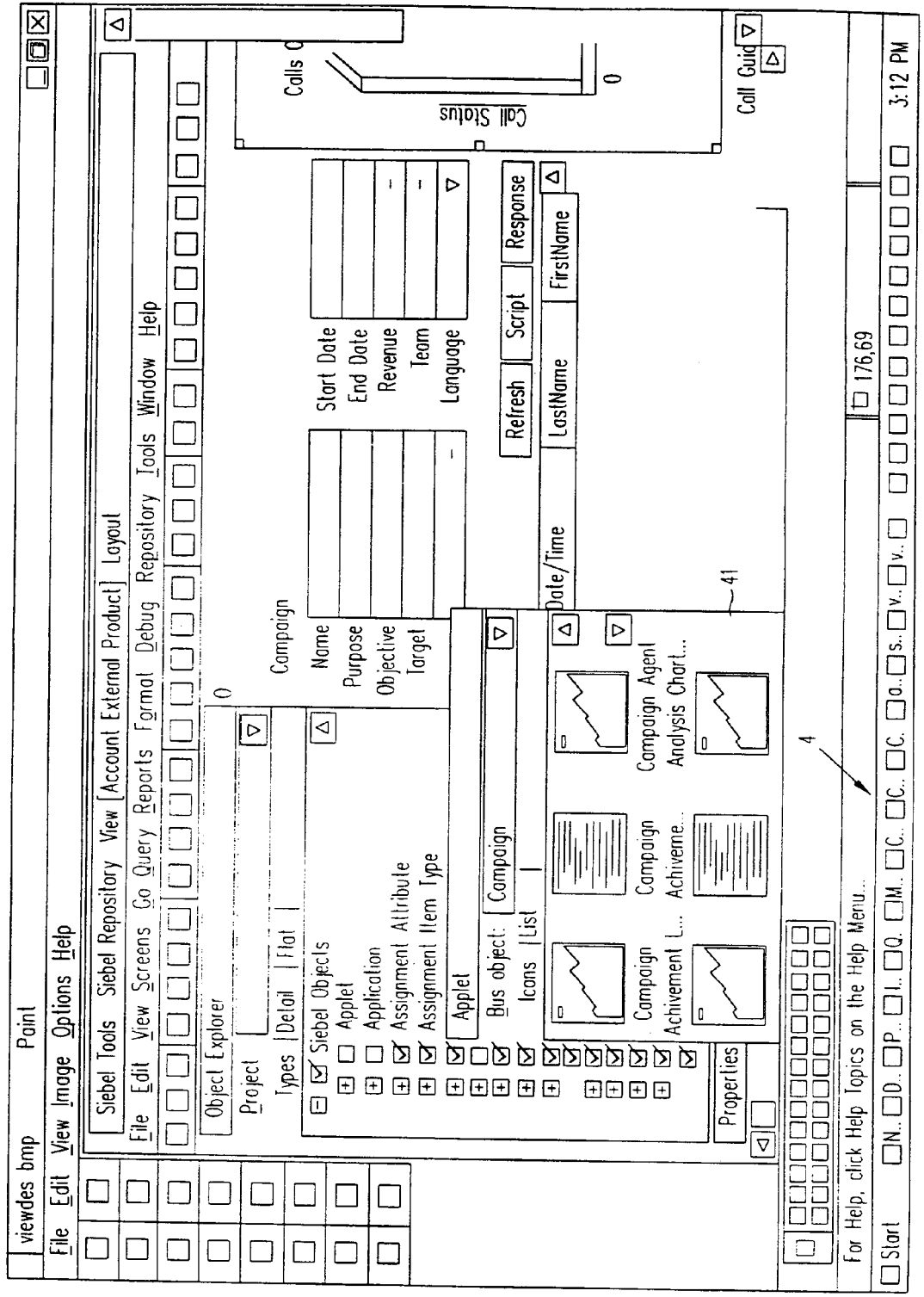
FIG. 4 illustrates a screen shot of features of the view.

The view designer module of the development tool method and system of our invention allows developers to visually modify existing views and construct new views by simply dragging and dropping the desired Applets onto the view canvas. There is no additional specification or code required to define the relationships between the Applets. Most other application customization tools require developers to write significant amounts of code to achieve this same functionality. In the prior art, this code had to be replicated for each and every screen in the application. This was inefficient and error-prone. Features of the view designer 4 are illustrated in FIG. 4. To create a View based on a specific Business Object, the developer is presented with a blank canvas with eight sectors and a window 41 containing the list of Applets that can be included in the View (based on the Business Object of the View). The desired Applets can then be simply dragged from the Applets window and dropped on the View canvas in the desired sector. The Applets may be resized at this point, if necessary. The underlying Business Components, and their context within the Business Object determine the relationships between the Applets in the View. Hence, these relationships do not need to be specified again in the definition of the View. They are simply re-used.

Menu Designer

The menu designer module of the development tool method and system of our invention allows developers to customize and extend Siebel menu structures using a visual metaphor. A menu can be created by adding menu items, defining the command to be executed when the menu is clicked, and specifying an accelerator key for easy navigation.

Object Wizards

The development tool method and system of our invention provides a set of Wizards to assist developers in the creation of new objects in the underlying repository. Examples of Wizards include a Form Applet Wizard, Chart Applet Wizard, List Applet Wizard, and Business Component Wizard. The user clicks on the type of the new object he or she wants to create, and the Wizard guides them through the entry of the properties needed for that type of object.

Typically, the graphical user interface guides the user through the various steps of creating an applet, such as selecting the business component that it is based on, the dimensions of the applet, the fields to be included, the buttons that appear in the applet, and the like. Wherever possible, the list of choices are restricted to only those that are applicable—Fields in the underlying Business Component, Projects that have been locked by the developer, etc. Once the developer has gone through the various screens in a wizard, a new Object is created based on the attributes specified. A default layout is generated for the type of Object being created. For example, for a Form Applet, Text box and Check box controls are created for each Business Component Field that is to be included in the Applet, depending on the data type of Field. Labels are also created right next to the Text boxes and Check boxes. All these controls are laid out in an aesthetically pleasing columnar layout.

Business Object Repository Manager

The business object repository manager of our invention provides application developers with an efficient multi-user development environment that includes access to check-in/check-out functionality and version control. In a typical development environment, there is a server repository that contains the master application definition. Each developer on the team has a local repository that the development tools method and system of our invention connects to. The various object definitions in the business object repository are grouped into Projects. Developers lock and check out projects from the server repository onto their local repositories in order to make changes to the object definitions. If another developer tries to check out the same Project, he/she is unable to do so, and is informed that the Project is locked. This prevents other developers on the team from modifying the same project. Once the developer has made the changes and tested them, the project can be checked into the server repository. Before checking in a project, the developer can review the changes that have been made thereby minimizing check-in errors. The check-in/check-out process can be integrated with an external version control system such as Microsoft Visual SourceSafe, PVCS, or ClearCase. This allows the development team to maintain a version history of all changes to the repository.

Business Object Compiler

This tool that is part of the development tool method and system of our invention allows developers to compile the repository or projects either completely or incrementally. Incremental compilation involves a compilation of only a subset of the Projects (typically those that have been modified). The definitions of objects in these Projects are the only ones that are updated. The remainder of the repository file is left untouched. This significantly speeds the development cycle of any project. The compiler generates a repository file that is used to run the underlying application. The storage of the application definition in the repository file is optimized for high-speed access and performance. This repository file is then deployed to the end-users of the application. The application executable reads the application definition from the repository file and instantiated objects based on their definitions stored in the repository file.

Programming Platform

Figure 5:
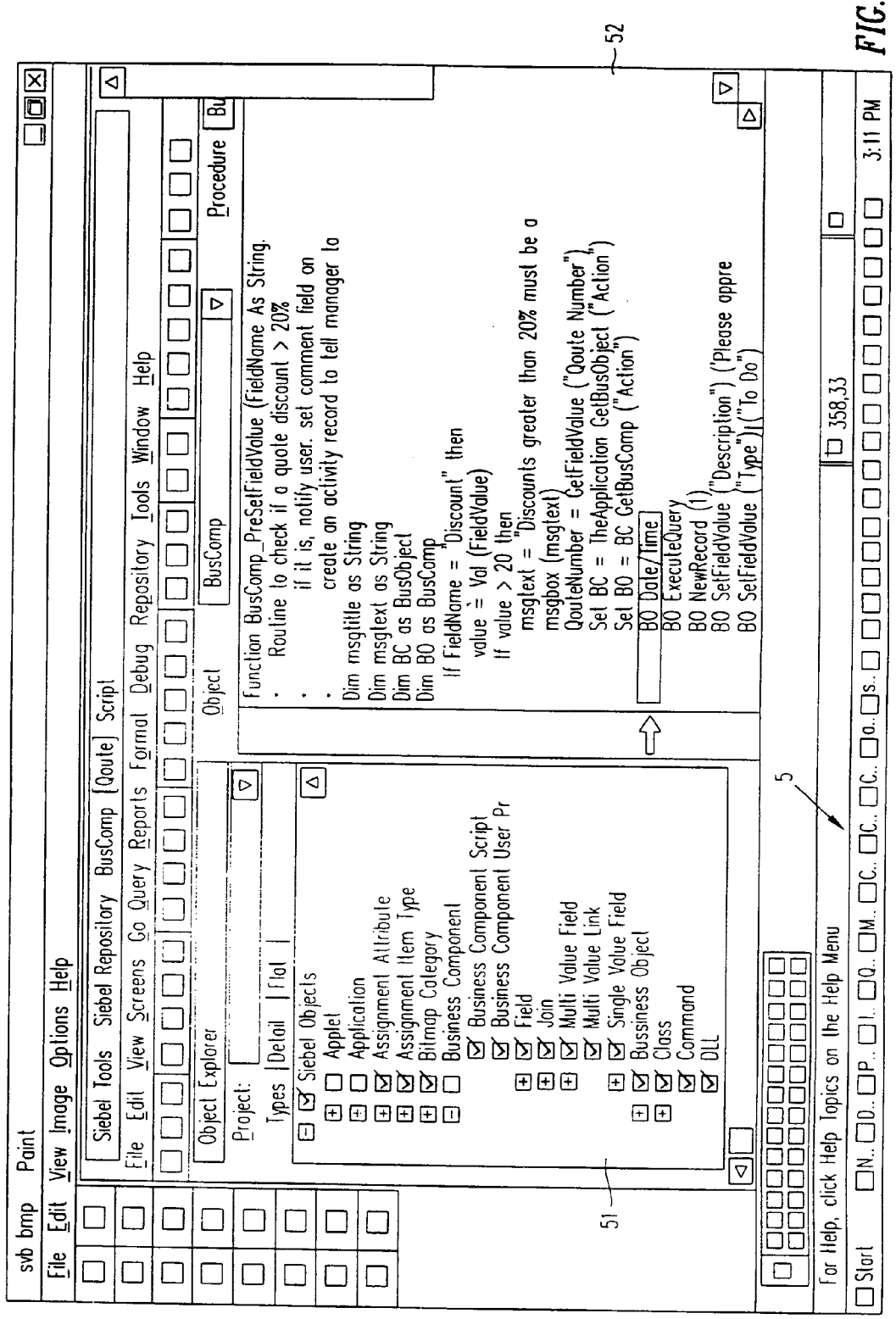
FIG. 5 illustrates a screen shot of aspects of the editor and debugger.

The development tool method and system of our invention includes a development platform. For example, a Microsoft Visual Basic or Microsoft Visual C++ programming platform for integrating enterprise applications with third-party cooperative applications and extending the base functionality of the application screens and business components. In a preferred embodiment of our invention, the Visual Basic provides a Visual Basic-compliant environment that includes an editor, debugger, and interpreter/compiler. This allows application developers to extend and further configure applications. This capability may be integrated with the Applet Designer so developers can attach scripts to user interface element controls such as buttons, fields, and ActiveX controls. Business component behavior can also be further configured using the programming platform. FIG. 5 illustrates some aspects of the editor and debugger screen 5. It includes the object explorer 51 and the object code view, 52.

Business Object Interfaces

Not only can application developers extend applications with the development platform, e.g., Visual Basic, they can also use COM interfaces to access data from third-party applications, provide integration with legacy systems, and automate applications from other external applications. This allows developers to extend application behavior, provide client-side integration to other applications, and enable access to data and business rules from other programs that use Microsoft Visual Basic, Powerbuilder, Java, or ActiveX. COM interfaces expose selected objects to custom routines external from the applications. Developers can access these COM interfaces using a wide variety of programming languages.

Database Extension Designer

When developers require extensions beyond built-in database extensions, the database extension designer module of the method provides a point-and-click interface to extend application tables. Developers can use these database extensions to capture data from new fields in application screens, or from external sources using enterprise integration managers.

The database extension designer is integrated with the business object repository. The developer first defines the extensions in the repository and makes use of these extensions in Business Components and Applets. These changes are then applied to the local database by clicking on the Apply button. This causes the database schema of the local database to be updated. The developer then tests these extensions in the local environment. Once the testing is complete, the changes are checked into the server repository and made available to the rest of the team.

This process allows developers to make one set of changes that automatically triggers updates to client applications that reflect and incorporate the new database extension into mobile users' databases. These changes reflect the appropriate visibility rules for database extensions. New columns are automatically reflected in the business object repository and named appropriately to ensure easy migration to, for example, future releases of applications.

The database extension designer works with client-server applications to provide seamless integration of database extensions for mobile user databases. The database extension designer automatically applies database extension instructions to the server database and these extensions are automatically routed to mobile user databases via remote software distribution applications such as Siebel Remote. Changes take effect automatically the next time mobile users synchronize. The changes are "in-place," so mobile users do not need to refresh or reinitialize their local database.

Application Upgrader

Figure 6:
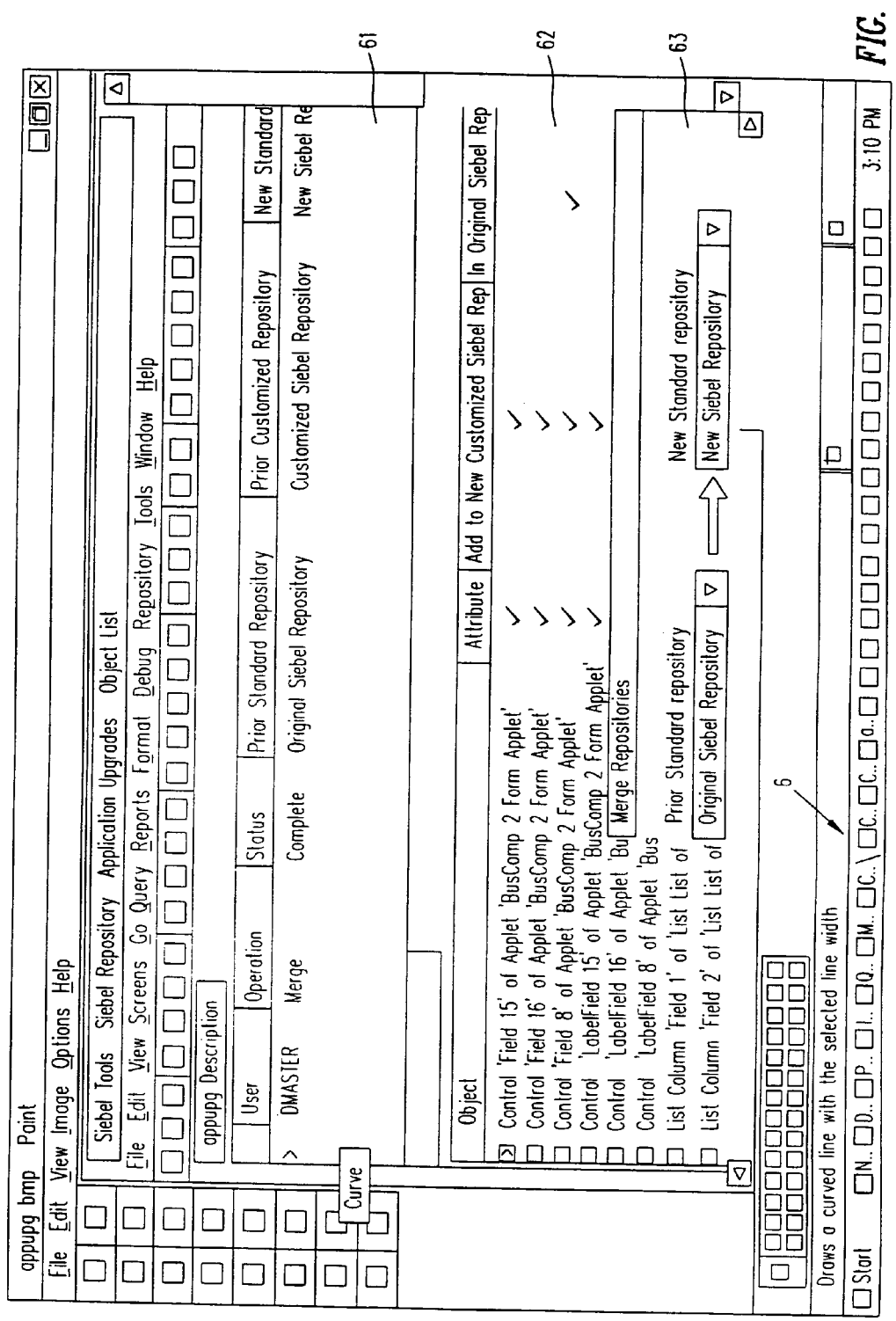
FIG. 6 illustrates a screen shot of the components of the application upgrader.

The application upgrader module of the method and system of our invention dramatically reduces the time and cost of version upgrades by allowing customers to better determine what changes are available with each release and compare unique object customizations from the prior release with changes in the new release. The application upgrader provides systems administrators with notification of conflicts between object customizations and new releases, automatically merges differences between object definitions, and allows administrators to manually override and apply any changes. This tool obviates the need to manually migrate changes from release to release and significantly reduces the total lifecycle cost of ownership of typical business applications as compared to traditional client/server applications. FIG. 6 illustrates the components of the application upgrader 6 of the method and system of our invention. The Application Upgrader screen has two views, an "Application Upgrades" view, 61, and an "Object Differences" view, 62, as well as a "Merge Repositories" choice box 63.

The Application Upgrader identifies customizations made to an Application, and applies these customizations to the newer release of that Application. Application definitions are contained in a repository. The Application upgrader compares three repositories—the Prior Standard Repository, the Customized Repository, and New Standard Repository—and generates a fourth repository (New Customized Repository) based on the new repository but containing the customizations made by the customer. Any object definitions that have been added to the Customized Repository, but not in the New Standard Repository are added to the New Customized Repository. If an object definition has been modified in the Customized Repository and also in the New Standard Repository, the upgrader compares each attribute of the two versions of object definition, and for each conflict encountered (i.e. differing attribute values), selects the value from one of the versions based on a set of pre-determined rules. All conflicts and their resolutions are presented to the user who then has the option of reviewing these and overriding the default resolution adopted by the Application Upgrader.

The result of the upgrade process is an upgraded version of the Application that incorporates the features of the new release with the customizations made to the prior release.

While the invention has been described with respect to certain preferred embodiments and exemplifications, it is not intended to limit the scope of the invention thereby, but solely by the claims appended hereto.

We claim:

1. A method comprising:
  assisting an end-user in creating a customization of a new version of an application from a customization of an old version of the application, wherein
    the customization of the new version of an application comprises at least one end-user-created module,
    the at least one end-user-created module is created from at least one of a plurality of reusable modules, wherein the assisting comprises;
  receiving an indication of one or more changes to be made to one or more variables of the at least one of the plurality of reusable modules, wherein
    the at least one end-user-created module is configured to inherit attributes of the at least one of the plurality of reusable modules, and
    the at least one end-user-created module comprises the one or more changes to be made to the one or more variables;
  automatically checking for a conflict between the at least one end-user created module and the plurality of reusable modules;
  in response to not detecting the conflict, executing the customization of the new version of the application in such a manner that the functionality associated with the at least one end-user created module is accessible to the end-user.

2. The method of claim 1, wherein
  the creating the customization of the new version of an application is facilitated by a wizard module corresponding to the at least one of the plurality of reusable modules, and
  the wizard module guides the indication of the one or more changes to be made to the one or more variables.

3. The method of claim 1, wherein
  the one or more changes to be made to the one or more variables comprise modifications other than modifications of code associated with the at least one of the plurality of reusable modules of the new version of the application.

4. The method of claim 1, wherein
  the at least one of the plurality of reusable modules of the new version of the application has at least one associated object, and the one or more changes to be made to the one or more variables comprise modifications of definitions of the at least one associated object.

5. The method of claim 1, wherein
  the at least one end-user-created module provides at least one of a list, a form, a dialog, and a chart user interface.

6. The method of claim 1, wherein
  the receiving is in response to a provided enumeration of required end-user entries for an indicated type of the end-user-created module.

7. The method of claim 1, wherein
  the creating the customization of the new version of an application is facilitated by a wizard module corresponding to the at least one of the plurality of reusable modules, and
  the wizard module is configured to guide the indication of the one or more changes to be made to the one or more variables.

8. A computer program product comprising:
  a plurality of instructions, comprising
    a first set of instructions, executable on a computer system, configured to assist an end-user in creating a customization of a new version of an application from a customization of an old version of the application, wherein
      the customization of the new version of an application comprises at least one end-user-created module,
      the at least one end-user-created module is created from at least one of a plurality of reusable modules,
      the first set of instructions comprise
        a first subset of instructions, executable on the computer system, configured to receive the new version of the application and the plurality of reusable modules, wherein
          the plurality of reusable modules are provided with the new version of the application,
          each of the plurality of reusable modules comprises associated code, and
          each of the plurality of reusable modules comprises one or more variables accessible by the end-user,
        a second subset of instructions, executable on the computer system, configured to
          for the at least one of the plurality of reusable modules,
            receive an indication of one or more changes to be made to the one or more variables of the at least of the plurality of reusable modules, and
            create the at least one end-user created module, wherein
              the at least one end-user-created module is configured to inherit attributes of the at least one of the plurality of reusable modules, and
              the at least one end-user-created module comprises the one or more changes to be made to the one or more variables,
        a third subset of instructions, executable on the computer system, configured to automatically check for a conflict between the at least one end-user created module and the plurality of reusable modules, and
        a fourth subset of instructions, executable on the computer system, configured to, in response to not detecting the conflict, execute the customization of the new version of the application in such a manner that the functionality associated with the at least one end-user created module is accessible to the end-user; and a non-transitory computer-readable storage medium, wherein the instructions are encoded in the computer-readable storage medium.

9. The computer program product of claim 8, wherein the functionality associated with the plurality of reusable modules and the functionality associated with the at least one end-user created module are configured to allow the end-user to interact with the plurality of reusable modules and the at least one end-user created module via a graphical user interface of the customization of the new version of an application.

10. The computer program product of claim 8, wherein the second subset of instructions comprises:
a first sub-subset of instructions, executable on the computer system, configured to create a new type of object that is derived from a type of the at least one of the plurality of reusable modules.

11. The computer program product of claim 8, wherein the plurality of reusable modules are configured to be used by the end-user in creating the at least one end-user created module.

12. The computer program product of claim 8, wherein the second subset of instructions comprises:
a first sub-subset of instructions, executable on the computer system, configured to facilitate creation of the at least one end-user created module by providing a wizard module configured to guide the creation.

13. The computer program product of claim 8, wherein the one or more changes to be made to the one or more variables comprise modifications of definitions of a plurality of existing objects.

\* \* \* \* \*